Patented Mar. 18, 1930

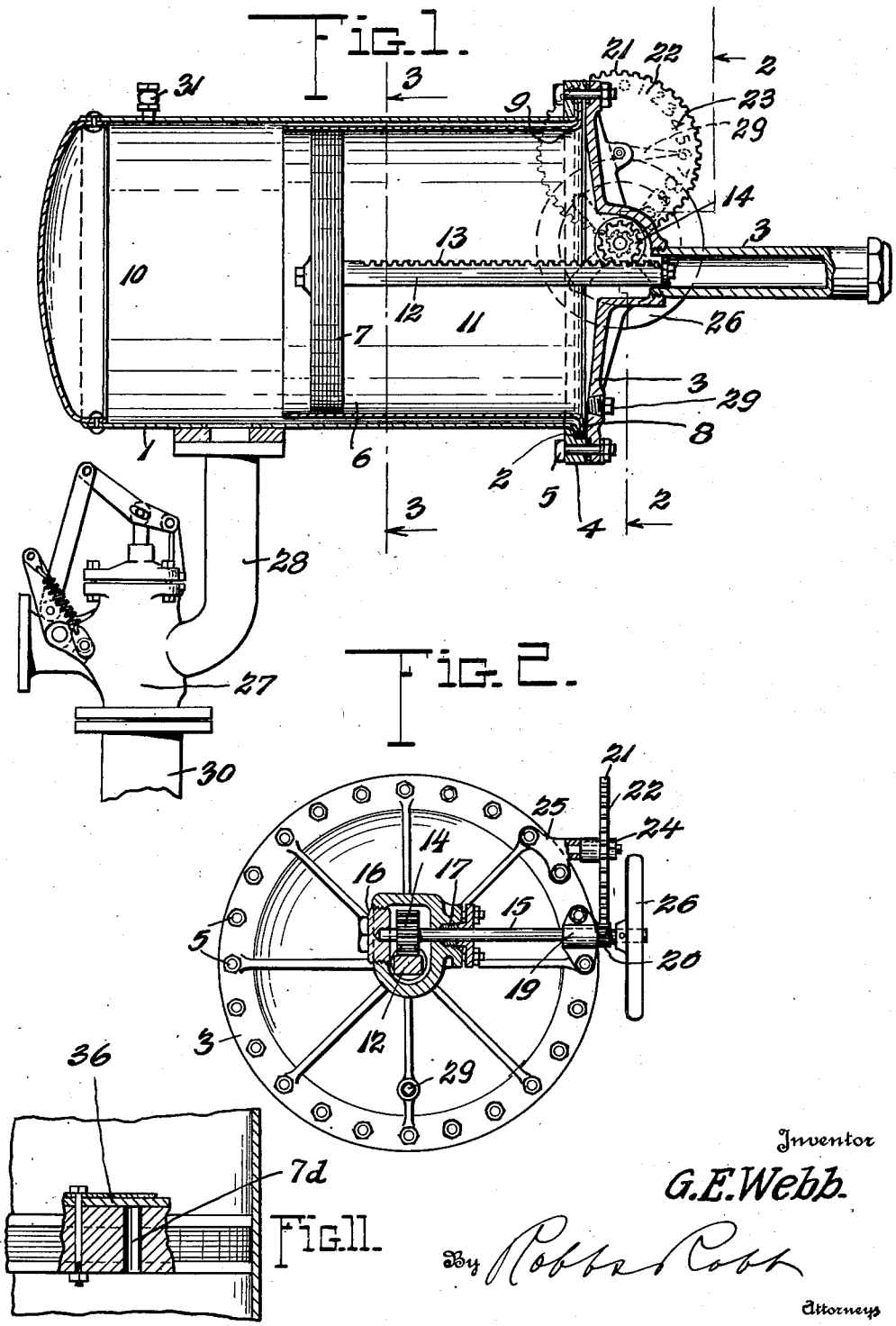

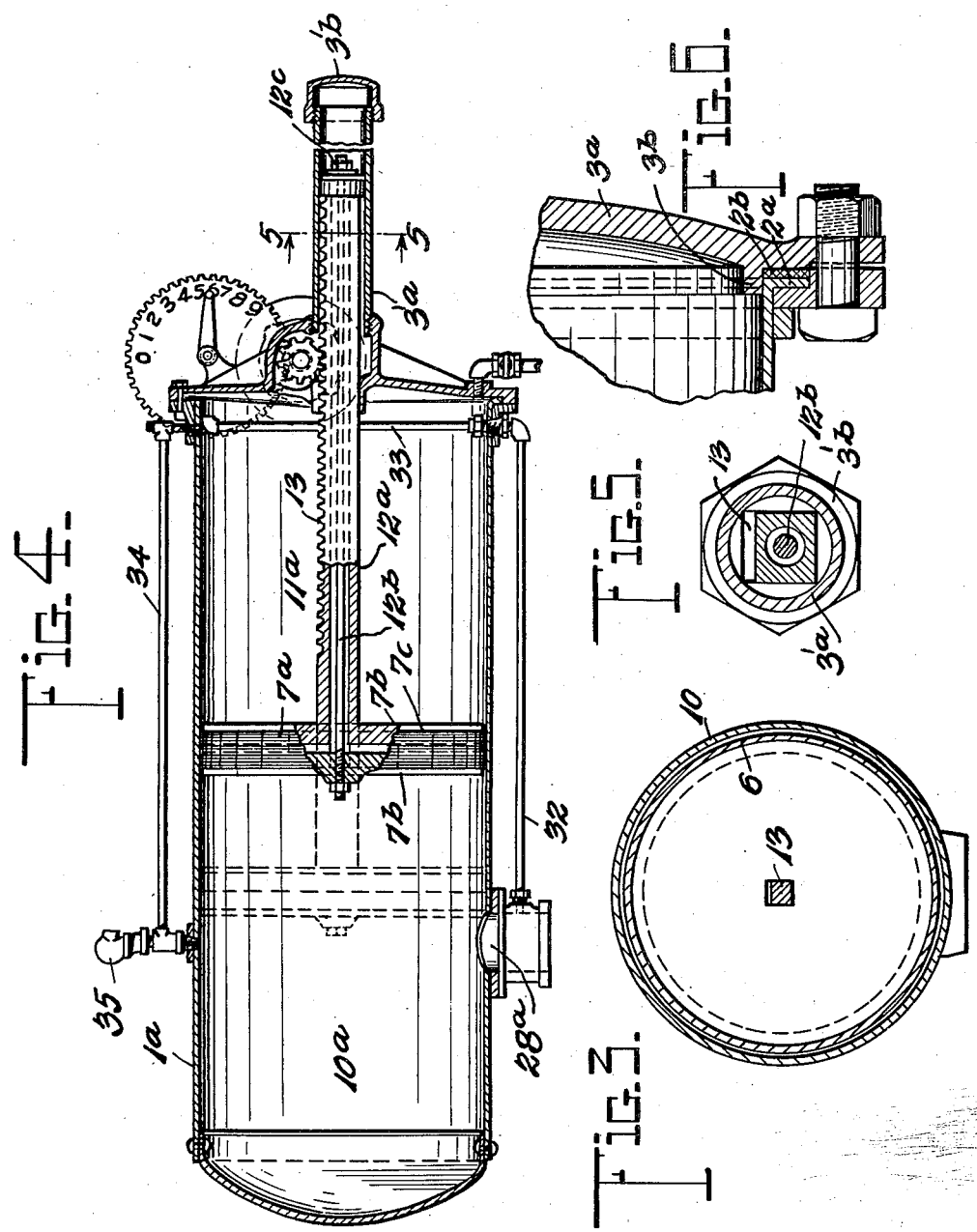

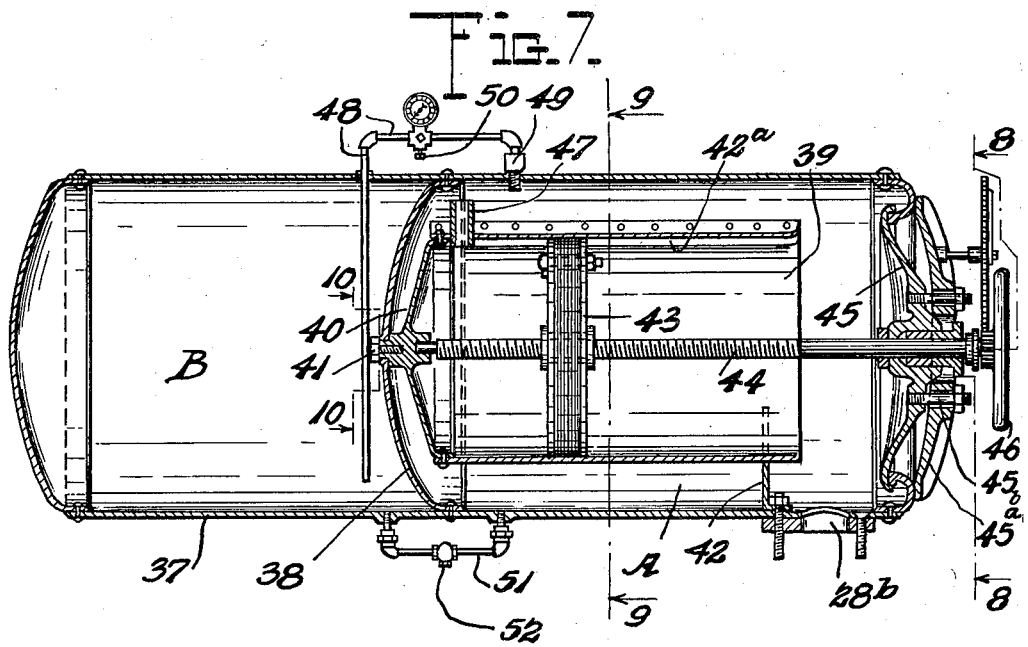
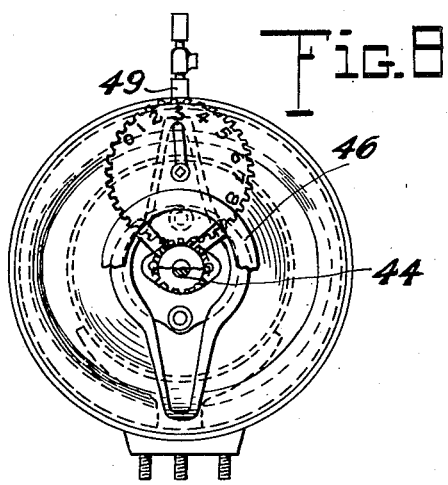
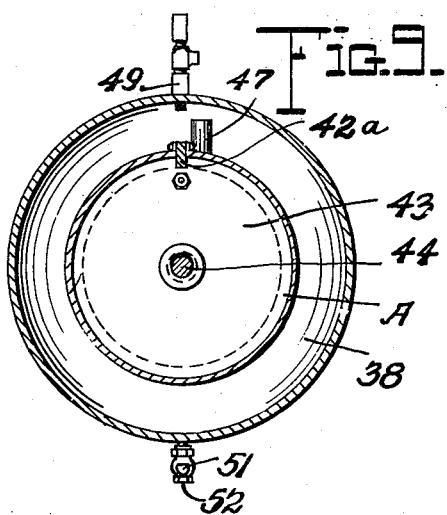
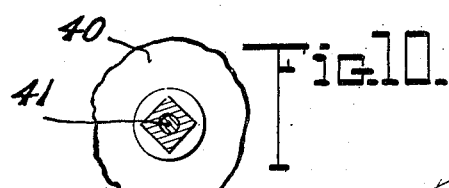

1,750,979

UNITED STATES PATENT OFFICE

GEORGE E. WEBB, OF MILWAUKEE, WISCONSIN, ASSIGNOR TO KOEHRING COMPANY, OF MILWAUKEE, WISCONSIN, A CORPORATION

WATER-MEASURING TANK

Application filed October 12, 1926. Serial No. 141,169.

The present invention appertains to improvements in water tank measuring apparatus for concrete mixers. Concrete engineers have long since recognized the desirability of using an accurately measured quantity of water in the mixing of batches of cement, because of the relation it has to the strength of the material in the structure or other completed work. It is no longer feasible in major operations to ignore the water content of the mix or to allow the operator of the mixer to control this on a guesswork basis. Control on this basis is all the more difficult when it is considered that the water content is a variable factor which depends upon the type of cement work to be done. For these reasons concrete mixing apparatus embody, or should embody, water tanks the capacity of which is accurately predetermined and these are designed with a view of affording a quick measuring water receptacle for the individual batches of the mix in which provision is made for ready variation of the measuring compartment.

The object of these improvements is to provide a water measuring tank of this type which will insure a very accurate measuring of the required amount of water to be delivered to the mixing drum, novel means being embodied in the construction for varying the capacity of the measuring compartment at will, while maintaining an equalizing pressure at opposite sides of the capacity varying means.

An important feature of my invention resides in the utilization with my water tank above referred to of an automatic air pressure system which in the preferred form of my apparatus embodies the principle of trapping of the air displaced from the water compartment by the filling thereof with the measured quantity of water.

More specifically, my invention comprises a water tank of suitable size which is divided interiorly by a movable partition into two compartments, one of which constitutes the measuring compartment and the other a displacement compartment in which excess or surplus water is trapped. This arrangement is modified when air pressure is to be used for assisting in the discharge of the measured liquid by the provision of an additional compartment for storage of trapped air displaced by the liquid from the measuring compartment.

Other objects and advantages of the invention will be hereinafter set forth and the novel features thereof defined by the appended claims.

In the accompanying drawings:

Figure 1 is a longitudinal sectional view of an embodiment of my invention;

Figure 2 is a transverse sectional view on the plane indicated by the line 2—2 of Figure 1;

Figure 3 is a transverse sectional view on the line 3—3 of Figure 1;

Figure 4 is a longitudinal sectional view of a modification of the device wherein the inner sleeve or cylinder is dispensed with;

Figure 5 is a sectional view on the line 5—5 of Figure 4;

Figure 6 is an enlarged fragmentary view showing the leak-proof clamp arrangement for the tank head;

Figure 7 is a longitudinal sectional view of a modified form of tank embodying the automatic air pressure system;

Figures 8, 9 and 10 are sectional views on the respective lines 8—8, 9—9 and 10—10 of Figure 7; and Figure 11 is an enlarged detail sectional view showing a modified type of piston with a supplemental water port and coacting check valve therein.

Like reference characters designate corresponding parts throughout the several figures of the drawing.

Referring to the drawings and to that form of the invention disclosed in Figure 1 of the same, 1 designates a water tank of proper capacity and configuration to serve the mixer with which it is equipped. The tank is preferably cylindrical in form and open at one end, the metal at said end being flanged outwardly as indicated at 2. A closure head 3 of special construction with which a ring 4 cooperates to grip the flange 2, serves to tightly close the end of the tank. Suitable bolts 5 pass through the ring and head to securely clamp the flange 2 and provide a leak-proof joint.

Within the tank is mounted a cylindrical sleeve 6 of slightly smaller diameter than the inner diameter of the tank so as to leave an appreciable annular space to provide for passage of the liquid between the walls of the tank and sleeve. This sleeve 6 is preferably formed of thin resilient sheet metal with a consequent flexibility adapting it to conform readily to the shape and to the movements of the piston to be hereinafter described. While this sleeve might readily be dispensed with, as will be hereinafter shown, for certain reasons to be later set forth I prefer to employ the same. It may be of any desired length, at least sufficient to accommodate for a full stroke of its piston 7. At one end the sleeve is outwardly flanged in a fashion similar to the end of the tank and as shown at 8, said flange being received between the tank flange 2 and the head so as to firmly hold the sleeve in the inwardly extending spaced position above referred to.

At the top of the outer end of the sleeve, a small port 9 is provided, this establishing communication between the interior of the tank and the interior of the sleeve. As a matter of fact the piston 7 divides the tank into two compartments, one of which I shall term the measuring compartment, that designated 10, and the other, the displacement compartment, designated 11. The position of the piston 7 is variable and by virtue of this fact the capacity of the measuring compartment 10 may be modified as desired within the range of capacity of the water tank.

To adjust the piston 7, the piston rod 12 connected thereto passes through the head 3 and into the tublar extension 3' detachably secured to said head, the upper edge of said piston rod being formed with teeth 13 to provide a rack with which the pinion 14 mounted upon the inner end of the shaft 15 cooperates. This shaft has its bearing at one end in a removable plug 16 located in the head 3 and passes through the stuffing box 17 and the outer bearing 19. A smaller pinion 20 adjacent this bearing meshes with the peripheral teeth 21 of an indicator disk 22. This disk is suitably calibrated in terms of gallons or any other arbitrary scale and the desired indicia 23 provided on its outer face to coact with the stationary pointer 24. Preferably the ratio of the gearing is such that one complete revolution of the disk 22 which is conveniently mounted upon a bracket 25 secured beneath the head bolts represents one complete stroke of the piston. At the end of the shaft 15 is provided a hand wheel 26, the operation of which will shift the piston 7 inwardly or outwardly of the sleeve 6 and it follows that when moved inwardly the capacity of the measuring compartment 10 is reduced and when moved outwardly its capacity is increased.

In the operation of this construction, the water is supplied from a suitable source leading to the three-way valve 27 of known construction and through the pipe 28 letting into the bottom of the compartment 10, the capacity of which has been previously settled upon according to the work to be served by suitable adjustment of the piston 7. The water fills the compartment and when it reaches the level of the opening 9 in the sleeve 6 it passes into the displacement compartment 11. This arrangement affords a balanced pressure at opposite sides of the piston 7. This feature of the present construction is of considerable importance because it will be obvious that if the water was not allowed to pass over into the displacement compartment there would be a tendency to move the piston 7 under the influence of the water pressure head. As it stands the pressure is exerted in all directions uniformly excepting when the measuring compartment is discharged when the pressure is entirely relieved except that which is due to the static head and this is of a negligible character.

Once the water is introduced into the compartment 11 it will be understood that it is allowed to remain therein at all times unless it is desired to clean said compartment which is necessary only at long intervals. It is emptied for this purpose by removing the plug 29 in the head 3. The measured quantity of water in the compartment 10 is discharged therefrom into the mixer drum or elsewhere by shifting the three-way valve, allowing the water to pass through the pipe 28 into the inflow pipe 30 leading to the drum.

When it is desired to increase the capacity of the measuring compartment 10 the piston 7 is moved toward the right and in so doing the surplus water trapped in the displacement compartment 11 is expelled through the opening 9 into the compartment 10 and passes out therefrom in the next discharge of the contents of this compartment.

In the reduction of the capacity of the compartment 10, the piston is moved to the left and in the next filling of the tank the void in the compartment 11 is filled by overflow into the same through the opening 9.

At one end of the tank I provide an automatic air valve 31 of a known type which allows the air to pass but operates as a check when the water level reaches the same and acts upon the valve member to prevent escape of the water.

As hereinbefore premised, the inner sleeve 6 shown in Figure 1 may be dispensed with if tanks of sufficient uniformity and smoothness of bore can be secured. The inner sleeve arrangement, however, from the manufacturing standpoint possesses a number of advantages because it, the sleeve, may be made of very thin metal of a non-corrosive character, and by reason of its thinness it will shape itself to the piston as the latter is moved from one point to another in the operation of variation of the capacity of the tank. While the gauge of the metal used in these tanks is fairly heavy, nevertheless it not infrequently occurs that they are slightly dented and this would of course interfere with the adjustment of a piston if the walls of the tank were depended upon to serve as the cylinder for the piston. Furthermore, any sediment which is carried in by the water will naturally settle in the outer measuring compartment from which it is washed each time the tank is filled and emptied. Wear upon the cylinder or sleeve is therefore practically eliminated. Other advantages might well be mentioned but do not appear necessary to a further understanding of the utility of the device.

However, in Figure 4 I have illustrated the form taken by a water measuring tank of this type which is not provided with an inner sleeve cylinder for the piston. In this form the tank $1^a$ is provided with a smooth finish to snugly receive the piston $7^a$ which is of a type embodying the spaced plates $7^b$ between which is disposed the expansible packing $7^c$. Provision is made for taking up the wear on the packing by causing an adjustment of the plates $7^b$ through the instrumentality of the rod $12^b$ which passes through a bore in the piston rod $12^a$ and carries an adjusting nut $12^c$ at its outer end. By the removal of the cap $3'^b$ from the end of the tubular extension $3'^a$ access to the adjusting nut $12^c$ is secured and the adjustment of said nut against the end of the piston rod $12^a$ will cause a clamping action or pressure to be exerted upon the packing tending to squeeze it outwardly.

This form of the device differs in another essential respect, namely in the method of communication between the opposite sides of the piston or in other words between the measuring compartment $10^a$ and the displacement compartment $11^a$. It will be observed that the water enters the first named compartment through the opening $28^a$ and into the compartment $11^a$ by way of the pipe connection 32 which leads to the stand pipe 33 projecting vertically within the compartment $11^a$. This provides for maintenance of the water supply in the displacement compartment during the use of the apparatus. As the water moves into the displacement compartment the air is allowed to escape therefrom by way of the passage 34 which leads to the special air relief valve 35 corresponding to the valve 31 described in connection with the first mentioned form of this device. This valve of course prevents the water from passing out when the measuring compartment $10^a$ has been filled, although the water may also pass over to the displacement compartment by way of the pipe 34 when the level reaches the height of the passage, insuring a complete filling of the displacement compartment.

Figure 6 of the drawings discloses more clearly the manner in which the head $3^a$ of the tank is clamped around the flanged rim $2^a$ so as to provide a leak-proof joint. It will be observed in this figure that a gasket $2^b$ of the ordinary sheet material is interposed between the flange and the head and is overlapped by an annular ring $3^b$ formed on the inner side of the tank head.

In Figure 11 I have depicted a modified form of piston construction wherein a transverse opening $7^d$ is provided. It will be obvious that this is particularly designed for use in conjunction with those tanks which are placed vertically and that the water will pass in one direction through this opening into the displacement compartment but not in the reverse direction in view of the use of the check valve 36 coacting with said opening.

It will be apparent from the foregoing that the operation of both forms of the device hereinbefore set forth is practically the same. I have depicted in Figure 7, however, a form of measuring tank which does differ from the preceding ones in an essential respect although it embodies nevertheless the identical principle of operation, speaking with reference to the method of securing a measured quantity of the water through the instrumentality of a measuring compartment and a displacement compartment.

Referring to Figures 7 to 9 inclusive, the tank 37 is provided with a central partition 38 which is of concavo-convex form and this partition divides the tank into the water measuring section A and the air pressure section B. In the former compartment is mounted in spaced relation to the walls of the tank a sleeve or cylinder 39 open at one end and closed by the head 40 at the other end. This head is secured to the partition 38 by means of the bolt or other fastening device 41 and supported at its other end by the bracket 42. As will be observed by reference to Figure 9, the sleeve 39 is a split sleeve between the adjoining edges of which is disposed a longitudinal spline or key $42^a$ which coacts with the adjustable piston 43 to prevent rotation thereof. The piston is mounted upon the screw shaft or rod 44 which has its bearing at one end in the head 40 for the sleeve and at its other end in the removable head 45 for the tank. Said shaft carries at its outer extremity the hand wheel 46 by means of which the shaft may be rotated to shift the piston 43 in one direction or the other for the purposes of varying the capacity of the measuring compartment.

As in the previous instances, the adjustment of the piston is indicated upon the indicator arranged in association with the piston rod in a conventional manner as shown clearly in Figures 7 and 8. The trapping of the air at the inner end of the sleeve 39 or the displacement compartment is prevented by the provision of a short outlet tube 47.

It will be observed that the closure for the open end of the tank in this form of the device is of a radically different construction from that of the previous form. The tank embodies an oval shaped opening the lips of which are flanged inwardly to coact with the head 45 which is in the nature of a manhole cover. This cover is capable of being easily inserted in the oval opening in a manner quite well known and is held in place against the edge of the tank opening by means of the coacting clamp 45ᵃ and the adjusting bolts 45ᵇ.

Communication between compartments A and B is established by the pipe connection 48 at the top of the tank. In this line a water check valve 49 corresponding to the valves 31 and 35 of the other forms is provided so that the air in the compartment A is allowed to pass into the pressure compartment B although the water when it reaches the level of the valve 49 is precluded from following. For convenience purposes the line 48 extends into the compartment B to a point closely adjacent the bottom of the same. This extension is particularly designed to eliminate any water which may obtain access to the compartment B and collect therein during the operation of the device by virtue of the vacuum created by the discharge of water from compartment A.

There is a further connection at the base of the tank between compartments A and B, designated 51. This connection allows the water in both compartments to be drained off through the drain valve 52, as when the apparatus is laid up or not in use. The valve is of any well known variety and is placed so as to prevent the flow through pipe 51 from one compartment to the other. This draining operation may be facilitated by loosening a screw 50 to allow atmospheric air pressure to enter.

In the operation of this device it will be apparent that it is first necessary to adjust the piston 43 to regulate the capacity of the measuring compartment in the tank section A so that it will give an accurately determined desired quantity of water. The water is then admitted through the opening 28ᵇ and allowed to fill the section A of the tank completely, the filling operation passing the air from section A into section B by way of the pipe line 48. When the water has completely filled the section A the discharge into the mixer drum will take place upon rotation of the customary three-way valve used in connection with this device. The pressure which was built up in the compartment B by the filling operation is now allowed to act upon the water in compartment A to accelerate the delivery of the water to the drum. This of course is of considerable advantage in view of the fact that the charging of the water into the mixer drum must be effected within a short period of time to allow for the proper mixing of the concrete and aggregates before the drum contents are discharged.

Having thus described my invention, what I claim as new and desire to secure by Letters Patent is:

1. In liquid measuring apparatus of the class described, the combination of a tank having a partition therein, dividing said tank into a measuring compartment and a pressure equalizing compartment, means in said tank for varying the capacity of said measuring compartment, and means for admitting the liquid to opposite sides of the capacity varying means for equalizing the pressure thereon in the measuring operation and during the discharge of the measuring compartment.

2. In liquid measuring apparatus of the class described, the combination of a tank having a measuring compartment provided with a discharge opening, a movable member in said tank for varying the capacity of said compartment and forming a wall therefor, said member remaining stationary after once being set for a certain capacity, and means forming a passage which establishes communication between the measuring compartment and the side of the movable member opposite the measuring compartment.

3. In liquid measuring apparatus of the class described, the combination of a tank, a movable member mounted therein contacting the sides of the tank and dividing the tank into opposing compartments at opposite sides of said member, means for shifting the movable member to vary the capacity of the compartments and for introducing liquid into and discharging the same from both said compartments.

4. In liquid measuring apparatus of the class described, the combination of a tank, a movable member mounted therein contacting the sides of the tank and dividing the tank into opposing compartments, means for introducing and discharging liquid from one of said compartments, and means for introducing liquid into the opposing compartment as an incident to the filling of the other, said last named means being arranged to retain the liquid in said opposing compartment during discharge from said other compartment.

5. In liquid measuring apparatus of the class described, the combination of a tank, a movable member dividing said tank into opposing compartments one of which constitutes a measuring compartment and the other a liquid trapping compartment, means establishing communication between said compartments and maintaining said communication during substantially all phases of the operation of the apparatus, and means for moving said movable member to displace liquid from one of said compartments into the other.

6. In liquid measuring apparatus of the class described, the combination of a tank, a movable member dividing said tank into opposing compartments one of which constitutes a measuring compartment, water inlet and discharge openings for said compartments, and means for shifting the movable member to vary the capacity of the measuring compartment, said movable member constituting water displacement means for expelling surplus water from the other compartment when moved to vary the capacity of the measuring compartment, but said member remaining stationary during repetitive charging and discharging operations of the same capacity.

7. In liquid measuring apparatus of the class described, the combination of a tank having a measuring compartment, a piston for varying the capacity of said compartment, and a flexible sleeve in which said piston is mounted.

8. In liquid measuring apparatus of the class described, the combination of a tank having a measuring compartment, a piston for varying the capacity of said compartment, and an aperture sleeve to receive the piston mounted in said tank in spaced relation to the walls thereof to provide an annular passage having communication with the interior of the sleeve.

9. In liquid measuring apparatus of the class described, the combination of a tank having a measuring compartment, a sleeve mounted in said tank having one end opening into the measuring compartment, closure means for measuring compartment of said tank, the other end of said sleeve having a liquid trapping compartment therein, and a piston member mounted in said sleeve for varying the capacity of the measuring compartment.

10. In liquid measuring apparatus of the class described, the combination of a tank having a measuring compartment, closure means for said tank, a sleeve mounted in said tank having one end opening into the measuring compartment, the other end of said sleeve having a liquid trapping compartment therein, a piston member mounted in said sleeve for varying the capacity of the measuring compartment, and means mounted on said tank closure means for shifting the piston to vary the capacity of said measuring compartment.

11. In liquid measuring apparatus of the class described, the combination of a tank having a measuring compartment, closure means for said tank, a sleeve mounted in said tank having one end opening into the measuring compartment, the other end of said sleeve having a liquid trapping compartment therein, a piston member mounted in said sleeve for varying the capacity of the measuring compartment, and means mounted on said tank closure means for shifting the piston to vary the capacity of said measuring compartment, said last named means including an indicator device operable by the shifting means to predetermine the capacity of the measuring compartment.

12. In liquid measuring apparatus of the class described, the combination of a tank, means dividing the tank into opposing compartments, means in one of said compartments providing a variable capacity chamber having a water inlet and discharge opening, said last named means comprising a piston and cylinder construction, said piston providing compartments within the cylinder on both sides thereof and arranged so that the water is admitted to the said compartments at opposite sides of the piston, and means on said tank for passing the air from the said chamber into one of said compartments incident to filling of water thereinto, whereby to provide a pressure head for facilitating the discharge of water from said chamber.

13. In a water measuring device for concrete mixers, the combination of a tank having an air compartment and a water measuring compartment, means establishing communication between said compartments, and means in the measuring compartment for varying the measuring capacity of the compartment, said means including a piston and a sleeve, said sleeve being open at one end to the water measuring compartment and having at its other end a water trapping chamber.

14. In a water measuring device for concrete mixers, the combination of a tank having an air compartment and a water measuring compartment, means establishing communication between said compartments and maintaining said communication during the discharge of the measuring compartment, and means in the measuring compartmnt for varying the measuring capacity of the compartment comprising a sleeve, a piston mounted in said sleeve, rotatable means for actuating the piston to shift it to and fro in said sleeve, and means on said sleeve for holding the piston against rotation.

15. In a water measuring device for concrete mixers, the combination of a tank having an air compartment and a water measuring compartment, means establishing communication between said compartments, and means in the measuring compartment for varying the measuring capacity of the compartment comprising a sleeve, a piston mounted therein, a screw shaft for shifting the piston to and fro for predetermining the measuring capacity of the measuring compartment and an indicator device cooperating with said shaft.

16. In a water measuring device for concrete mixers or the like, the combination of a tank, a partition in said tank dividing the same into separate compartments, a water inlet and discharge opening for one of said compartments, an air inlet for the other of said compartments, means in the compartment having the water inlet and discharge opening for variably predetermining the measuring capacity of said compartment, said means including a piston and cylinder construction, the air from the compartment containing the capacity varying means being displaced by the filling of water into said compartment and being trapped in the other of said compartments, and means for discharging the water from the measuring compartment under the influence of the air pressure from the other compartment.

17. A water measuring tank for concrete mixers or the like comprising a tank, a detachable closure head for the end of the tank, a cylindrical sleeve mounted in the tank and having means for securing it to the end of the same, said sleeve being composed of relatively thin metal and being of a diameter relatively smaller than the tank to provide an annular passage between the walls of the sleeve and the tank, a piston mounted in said sleeve, and means for shifting the piston to and fro in said sleeve, the thinness of the metal of the sleeve allowing the walls thereof to conform to the shape of the piston as it moves in the same.

18. In liquid measuring apparatus of the class described, the combination of a tank having a fluid measuring compartment, a movable member in said tank constituting a confining wall of said compartment, said member being shiftable to vary its capacity, and means for subjecting the movable member at its side opposite the measuring compartment to pressure counterbalancing the pressure exerted by the fluid being measured.

19. In liquid measuring apparatus of the class described, the combination of a tank, a movable piston in said tank, the tank having a discharge opening at one side of the movable piston and means for establishing communication between said side of the tank and the tank at the opposite side of the movable piston, whereby the movable piston is subjected to equalizing pressures on its opposite faces during filling and discharging operations, the communication establishing means being adapted to maintain said communication throughout said filling and discharging operations.

20. Liquid measuring apparatus of the class described, comprising, in combination, a tank having a liquid measuring compartment, a movable member therein constituting a confining wall of said compartment, means for shifting said member to vary the capacity of the measuring compartment, said member remaining stationary after once being set for a given capacity, an air compartment, means forming a communicating passage between said compartments and means for introducing liquid into said measuring compartment, thereby displacing the air therefrom and into the air compartment to establish a pressure head therein for subsequently expediting the discharge of liquid from the measuring compartment.

In testimony whereof I affix my signature.
GEORGE E. WEBB.